US012794035B2

(12) United States Patent
Farahati

(10) Patent No.: US 12,794,035 B2
(45) Date of Patent: Nov. 10, 2026

(54) SOLID STATE BATTERY PACK ACTIVE STACK-UP PRESSURE MODULE AND BATTERY COOLANT FLUID SYSTEM

(71) Applicant: Schaeffler Technologies AG & Co. KG, Herzogenaurach (DE)

(72) Inventor: Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 772 days.

(21) Appl. No.: 18/184,391

(22) Filed: Mar. 15, 2023

(65) Prior Publication Data

US 2024/0313289 A1 Sep. 19, 2024

(51) Int. Cl.

*H01M 10/63* (2014.01)
*H01M 10/613* (2014.01)
*H01M 10/6568* (2014.01)
*H01M 50/264* (2021.01)
*H01M 50/512* (2021.01)

(52) U.S. Cl.

CPC ......... *H01M 10/63* (2015.04); *H01M 10/613* (2015.04); *H01M 10/6568* (2015.04); *H01M 50/264* (2021.01); *H01M 50/512* (2021.01)

(58) Field of Classification Search

CPC .. H01M 50/264; H01M 50/512; H01M 10/63; H01M 10/613; H01M 10/625; H01M 10/6568; H01M 10/0481; H01M 10/052; H01M 10/0562

See application file for complete search history.

(56) References Cited

U.S. PATENT DOCUMENTS

2020/0168959 A1* 5/2020 Hettrich ................ H01M 4/381
2023/0249807 A1* 8/2023 Georgin .................. B64C 25/44 701/70
2023/0420764 A1* 12/2023 Kim .................... H01M 10/613

* cited by examiner

*Primary Examiner* — Karie O'Neill Apicella
(74) *Attorney, Agent, or Firm* — Davidson Kappel LLC

(57) ABSTRACT

A battery assembly includes a battery housing and a plurality of battery cells stacked within the battery housing in a stacking direction. Each of the battery cells includes an anode current collector, an anode material on the anode current collector, a cathode current collector, a cathode material on the cathode current collector, and a solid-state electrolyte sandwiched between the anode material and the cathode material for transporting ions between the anode material and the cathode material. The battery assembly also includes a hydraulic actuator for forcing the battery cells together in the stacking direction, and a coolant circuit for providing coolant into the battery housing via a housing inlet to exchange heat with the battery cells and for providing coolant to the hydraulic actuator when the battery cells are being discharged.

19 Claims, 3 Drawing Sheets

SOLID STATE BATTERY PACK ACTIVE STACK-UP PRESSURE MODULE AND BATTERY COOLANT FLUID SYSTEM

TECHNICAL FIELD

The present disclosure relates generally to solid state electrolyte batteries and more specifically to solid state electrolyte batteries for motor vehicles.

BACKGROUND

Solid state electrolyte batteries are known.

SUMMARY

A battery assembly includes a battery housing and a plurality of battery cells stacked within the battery housing in a stacking direction. Each of the battery cells includes an anode current collector, an anode material on the anode current collector, a cathode current collector, a cathode material on the cathode current collector, and a solid-state electrolyte sandwiched between the anode material and the cathode material for transporting ions between the anode material and the cathode material. The battery assembly also includes a hydraulic actuator for forcing the battery cells together in the stacking direction, and a coolant circuit for providing coolant into the battery housing via a housing inlet to exchange heat with the battery cells and for providing coolant to the hydraulic actuator when the battery cells are being discharged.

A method of constructing a battery assembly includes stacking a plurality of battery cells within the battery housing in a stacking direction. Each of the battery cells includes an anode current collector, an anode material on the anode current collector, a cathode current collector, a cathode material on the cathode current collector, and a solid-state electrolyte sandwiched between the anode material and the cathode material for transporting ions between the anode material and the cathode material. The method also includes connecting a coolant circuit to the battery housing for providing coolant to the battery cells via a housing inlet and for providing coolant to a hydraulic actuator for forcing the battery cells together in the stacking direction when the battery cells are being discharged.

BRIEF DESCRIPTION OF THE DRAWINGS

The present disclosure is described below by reference to the following drawings, in which.

DETAILED DESCRIPTION

Figure 1:
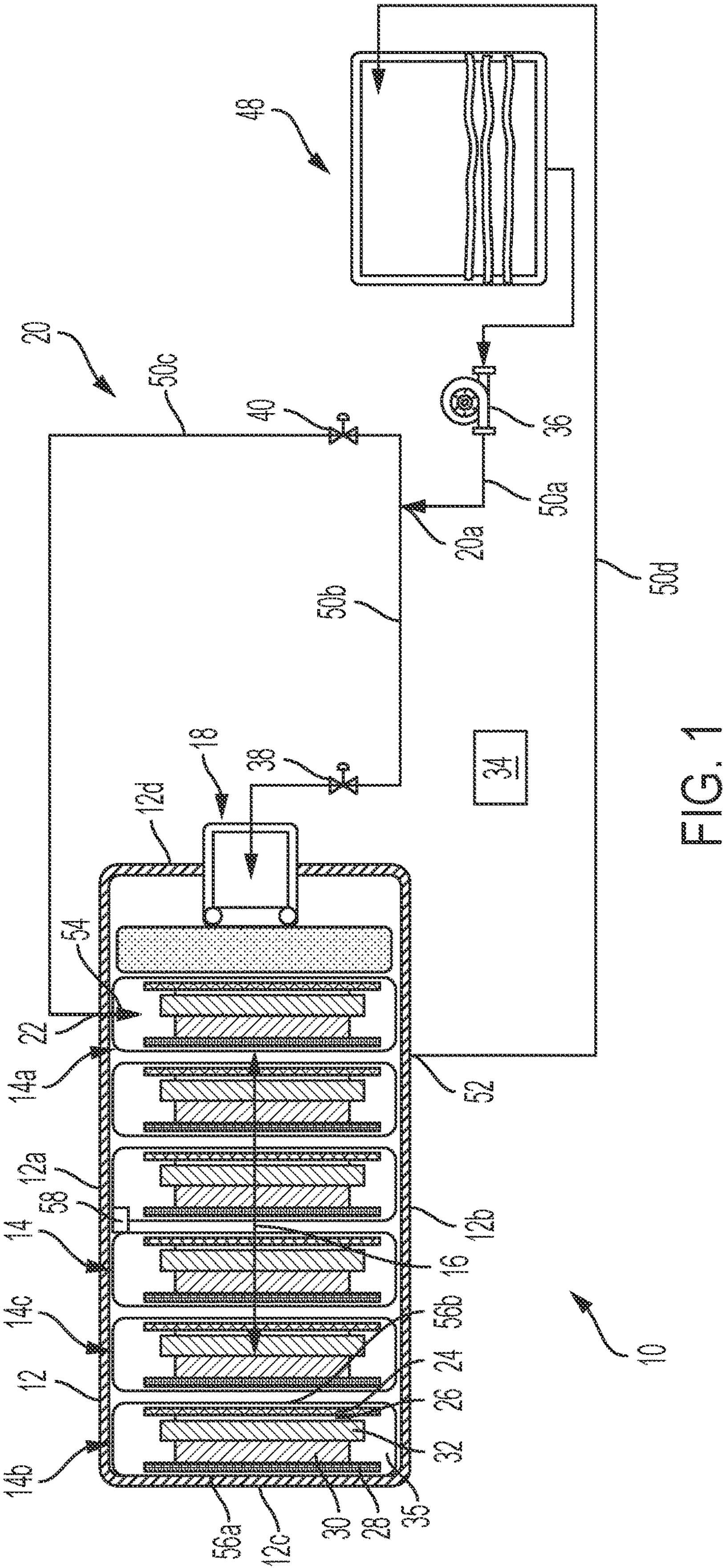
FIG. 1 shows a battery assembly according to the present disclosure.

FIG. 1 shows a battery assembly 10 including a battery housing 12, a plurality of battery cells 14 stacked within the battery housing 12 in a stacking direction 16 and a hydraulic actuator 18 for forcing the battery cells 14 together in the stacking direction 16. Battery assembly 10 also includes a coolant circuit 20 for providing coolant into the battery housing 12 via a housing inlet 22 to exchange heat with the battery cells 14 and for providing coolant to the hydraulic actuator 18.

Figure 4:
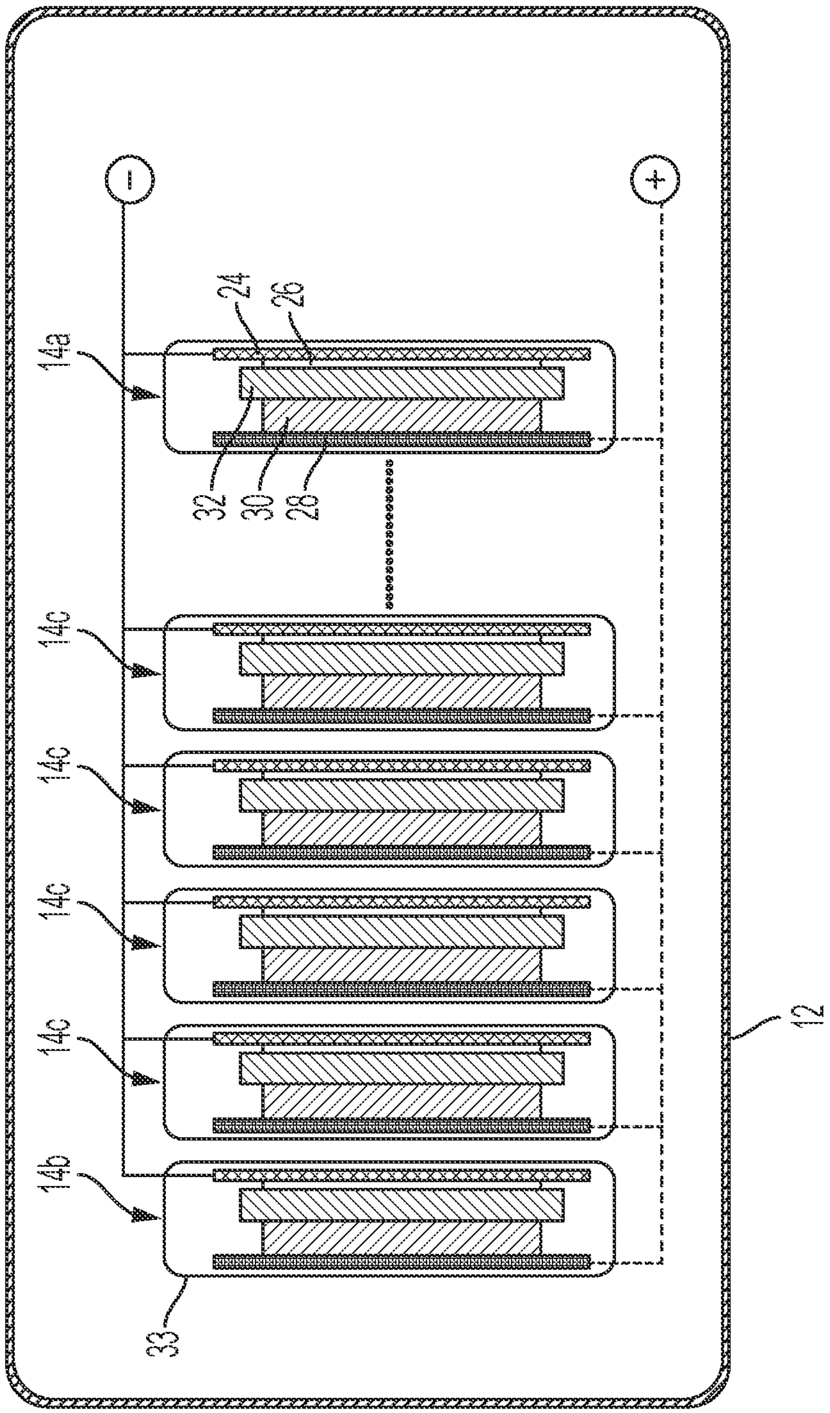
FIG. 4 schematically shows the battery cells of the battery assembly of FIG. 1 electrically connected to each other in parallel.

Each of the battery cells 14 includes an anode current collector 24, an anode material 26 on the anode current collector 24, a cathode current collector 28, a cathode material 30 on the cathode current collector 28 and a solid-state electrolyte 32 sandwiched between the anode material 26 and the cathode material 30 for transporting ions between the anode material 26 and the cathode material 30. In the example shown in FIG. 1, each of battery cells 14 includes packaging 33 surrounding the anode current collector 24, the anode material 26, the cathode current collector 28, the cathode material 30 and the solid-state electrolyte 32. Each packaging 33 can be a pouch formed of aluminum or a polymer. In other examples, each packaging 33 can surround a plurality of battery cells 14. The battery cells 14 are electrically connected to each other in parallel, as is schematically shown in FIG. 4.

Anode material 26 can be a lithium metal. Lithium metals forming the anode material 26 can include lithium iron phosphate (LFP), lithium nickel cobalt aluminum oxide (NCA), lithium nickel manganese cobalt oxide (NMC), lithium cobalt oxide (LCO) and lithium manganese oxide (LMO).

Cathode material 30 can be lithium iron phosphate (LFP), lithium nickel cobalt aluminum oxide (NCA), lithium nickel manganese cobalt oxide (NMC), lithium cobalt oxide (LCO), lithium manganese oxide (LMO), lithium titanate (LTO), nickel cobalt aluminum oxide (NCA) or nickel cobalt manganese (NCM)

The anode material 26 of each battery cell 14 expands in the stacking direction 16 during charging and contracts in the stacking direction 16 during discharging, which causes each of battery cells 14 to expand in the stacking direction 16 during charging and to contract in the stacking direction 16 during discharging. If battery cells 14 included liquid electrolytes, this expansion and contraction would not be an issue as liquid electrolyte penetrates both the cathode and anode materials. However, the rigid nature of solid-state electrolyte 32 can cause problems when anode material 26 expands and contracts due to the intercalation/(de)intercalation of the lithium ions into anode material 26 and cathode material 30. To prevent such problems, battery assembly 10 includes hydraulic actuator 18 to provide constant pressure to battery cells 14 during the charging and discharging in order to provide sufficient ionic conductivity between anode material 26 and cathode material 30.

It is noted that cathode material 30 can contract in the stacking direction 16 during charging, but to a lesser extent than anode material 26 expands, and can expand in the stacking direction 16 during discharging, but to a lesser extent than anode material 26 contracts.

Battery assembly 10 further includes a controller 34 configured to control a supply of coolant to the hydraulic actuator 18 as a function of whether the battery cells 14 are being charged or discharged. More specifically, battery assembly 10 includes a pump 36 and at least one flow regulator 38, 40, and the controller 34 is configured to control the supply of coolant to the hydraulic actuator 18 by controlling the pump 36 and the first flow regulator 38. Flow regulators 38, 40 can be electrically actuated solenoid valves.

The hydraulic actuator 18 includes an actuator housing 42 fixed with respect the battery housing 12 and piston 44 movable within the actuator housing 42. The piston 44 is movable to maintain a predetermined amount of force on the battery cells 14 in the stacking direction 16 to produce a predetermined contact pressure between the battery cells 14 in both a discharging orientation and a charging orientation of the battery cells 14. The hydraulic actuator 18 further includes a pressure plate 46 fixed to piston 44 for contacting a first end battery cell 14*a* of the battery cells 14 to force all of the battery cells 14 together in the stacking direction 16.

The coolant is supplied into the hydraulic actuator 18 at a first pressure when the battery cells 14 are being discharged and a second pressure when the battery cells 14 are being charged, with the first pressure being greater than the second pressure. The second pressure can be zero.

Figure 2:
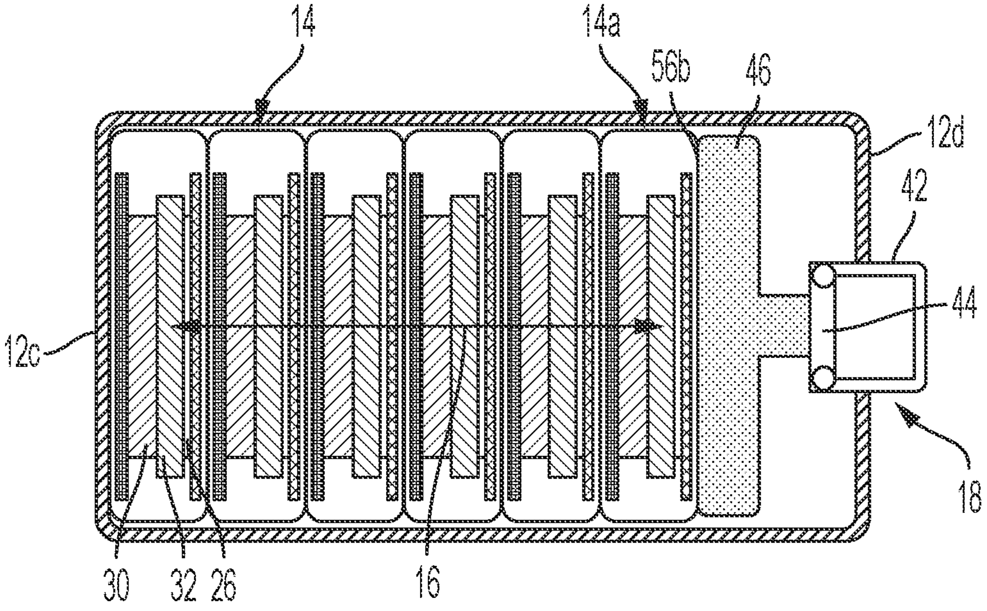
FIG. 2 schematically shows battery cells of the battery assembly of FIG. 1 in the discharging orientation, with a hydraulic actuator in an extended position.
Figure 3:
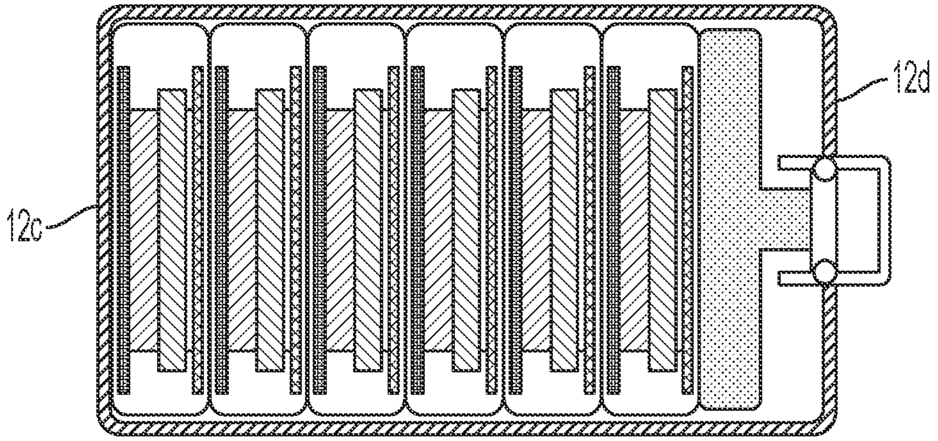
FIG. 3 schematically shows battery cells of the battery assembly of FIG. 1 in the charging orientation, with the hydraulic actuator in a retracted position.

The first pressure can be a function of a total amount the anode materials 26 contract in the stacking direction 16 minus a total amount the cathode materials 30 contract in the stacking direction 16. For example, FIG. 2 schematically shows battery cells 14 in the discharging orientation, with hydraulic actuator 18 in the extended position and FIG. 3 schematically shows battery cells 14 in the charging orientation, with hydraulic actuator 18 in the retracted position. In comparison with the discharging orientation, each anode material 26 has expanded in the stacking direction 16 by a distance x in the charging orientation and each cathode material 30 has contracted in the stacking direction 16 by a distance y in the charging orientation. To maintain a constant force on the battery cells 14 when the battery cells are in both the charging orientation and the discharging orientation, a piston 42 of hydraulic actuator 18 is moved a distance $n*(x-y)$ in the stacking direction between the discharging orientation and the charging orientation, with n being the number of battery cells 14 in the stack. In the discharging orientation of FIG. 2, the coolant is supplied into the hydraulic actuator 18 at the first pressure. In the charging orientation of FIG. 3, the coolant is supplied into the hydraulic actuator 18 at the second pressure.

Referring back to FIG. 1, battery assembly 10 further includes a coolant tank 48 supplying coolant to the pump 36. The coolant circuit 20 includes a first section 50*a* extending from the coolant tank 48 to an intersection 20*a*, a second section 50*b* extending from the intersection 20*a* to the housing inlet 22, a third section 50*c* extending from the intersection 20*a* to the hydraulic actuator 18, and a fourth section 50*d* extending from a housing outlet 52 to the coolant tank 48 to provide coolant exiting the battery housing 12 to the coolant tank 48. Coolant pump 36 is in the first section 50*a*, the first flow regulator 38 is in the second section 50*b*, and the second flow regulator 40 is in the third section 50*c*. The housing inlet 22 is arranged on the battery housing 12 to provide coolant from second section 50*b* into the battery housing 12 in a flow direction 54 traverse to the stacking direction 16. The coolant then flows around packagings 33 of battery cells 14 and out housing outlet 52.

The battery housing 12 includes a first wall 12*a* and a second wall 12*b* each extending parallel to the stacking direction 16, and a third wall 12*c* and a fourth wall 12*d* each extending traverse to the stacking direction 16. The hydraulic actuator 18 is configured for forcing the battery cells 14 toward the third wall 12*c* to maintain a constant contact force between the battery cells 14. The hydraulic actuator 18 is positioned within the fourth wall 12*d*.

The battery cells 14 each have two opposing planar surfaces 56*a*, 56*b* facing the stacking direction 16. The two opposing planar surfaces of each battery cell 14 are a first planar surface 14*a* facing the third wall 12*c* and a second planar surface 14*b* facing the fourth wall 12*d*. The anode current collector 24, the anode material 26, the cathode current collector 28, the cathode material 30 and the solid-state electrolyte 32 are stacked sequentially in the stacking direction between the first planar surface 56*a* and the second planar surface 56*b* of the respective battery cell 14. The housing inlet 22 is in the first wall 12*a* and the housing outlet 52 is in the second wall 12*b*.

The battery cells 14 include first end battery cell 14*a*, a second end battery cell 14*b* and a plurality of intermediate cells 14*c* arranged between the first end battery cell 14*a* and the second end battery cell 14*b* in the stacking direction 16. The pressure plate 46 of hydraulic actuator 18 is arranged for contacting the second planar surface 56*b* of the first end battery cell 14*a*. The first planar surface 56*a* of the second end battery cell 14*b* contacts the third wall 12*c*.

Controller 34 can perform the following exemplary algorithm to control hydraulic actuator 18. Controller 34 can be in communication with a charging controller of battery assembly 10 and may receive signals from the charging controller indicating that the battery cells 14 are being charged or discharged.

In response to a change in the charging/discharging orientation, controller 34 transmits corresponding signals to pump 36 and first flow regulator 38. If the controller 34 receives a signal indicating that battery cells 14 are switching from the charging orientation (FIG. 3) to the discharging orientation (FIG. 2), controller 34 sends a signal to first flow regulator 38 causing a flow passage of the first flow regulator 38 to increase in area and/or controller 34 sends a signal to pump 36 causing pump 36 to increase its pumping rate. In response to the sending of these signals, the coolant supplied to hydraulic actuator 18 increases, and piston 44 is moved away from fourth wall 12*d* and toward third wall 12*c* to cause pressure plate 46 to move first end battery cell 14*a* toward third wall 12*c*, decreasing the overall size of the battery cell stack in the stacking direction 16. This movement from the charging orientation (FIG. 3) to the discharging orientation (FIG. 2) maintains a constant contact pressure between each solid-state electrolyte 32 and the adjacent anode material 26 and cathode material 30 to preserve the ion conductivity of each battery cell 14.

If the controller 34 receives a signal indicating that battery cells 14 are switching from the discharging orientation (FIG. 2) to the charging orientation (FIG. 3), controller 34 sends a signal to first flow regulator 38 causing a flow passage of the first flow regulator 38 to decrease in area and/or controller 34 sends a signal to pump 36 causing pump 36 to decrease its pumping rate. In response to the sending of these signals, the coolant supplied to hydraulic actuator 18 decreases, and piston 44 is moved toward fourth wall 12*d* and away from third wall 12*c* to cause pressure plate 46 to move away from the third wall 12*c* to allow first end battery cell 14*a* to move toward fourth wall 12*d*, increasing the overall size of the battery cell stack in the stacking direction 16. This movement from the discharging orientation (FIG. 2) to the charging orientation (FIG. 3) maintains a constant contact pressure between each solid-state electrolyte 32 and the adjacent anode material 26 and cathode material 30 to preserve the ion conductivity of each battery cell 14.

Controller 34 can also control pump 36 and second flow regulator 40 to remove heat from battery cells 14 during charging and discharging. For example, a sensor 58 inside of battery housing 12 can transmit signals to controller 34 providing controller 34 with measuring data indicating the temperature of one or more battery cells 14. If one or more of battery cells 14 has a temperature above a predetermined threshold, controller 34 sends a signal to second flow regulator 40 causing a flow passage of the second flow regulator 40 to increase in area and/or controller 34 sends a signal to pump 36 causing pump 36 to increase its pumping rate. If one or more of battery cells 14 has a temperature below a predetermined threshold, controller 34 sends a signal to second flow regulator 40 causing a flow passage of the second flow regulator 40 to decrease in area and/or controller 34 sends a signal to pump 36 causing pump 36 to decrease its pumping rate.

A method of constructing the battery assembly 10 includes stacking the plurality of battery cells 14 within the battery housing 12 in the stacking direction 16, and connecting the coolant circuit 20 to the battery housing 12 for providing coolant to the battery cells 14 via the housing inlet 22 and to the hydraulic actuator 18 for forcing the battery cells 14 together in the stacking direction 16.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE CHARACTERS

10 battery assembly
12 battery housing
12*a* first wall
12*b* second wall
12*c* third wall
12*d* fourth wall
14 battery cells
14*a* first end battery cell
14*b* second end battery cell
14*c* intermediate cells
16 stacking direction
18 hydraulic actuator
20 coolant circuit
20*a* intersection
22 housing inlet
24 anode current collector
26 anode material
28 cathode current collector
30 cathode material
32 solid-state electrolyte
33 packaging
34 controller
36 pump
38 first flow regulator
40 second flow regulator
42 actuator housing
44 piston
46 pressure plate
48 coolant tank
50*a* first section
50*b* second section
50*c* third section
50*d* fourth section
52 housing outlet
54 flow direction
56*a* first planar surface
56*b* second planar surface
58 sensor

What is claimed is:

1. A battery assembly comprising:
a battery housing;
a plurality of battery cells stacked within the battery housing in a stacking direction, each of the battery cells comprising:
an anode current collector;
an anode material on the anode current collector;
a cathode current collector;
a cathode material on the cathode current collector; and
a solid-state electrolyte sandwiched between the anode material and the cathode material for transporting ions between the anode material and the cathode material;
a hydraulic actuator including a piston that is movable in the stacking direction for forcing the battery cells together in the stacking direction;
a coolant circuit fluidly connected to a housing inlet of the battery housing for providing coolant into the battery housing via the housing inlet to exchange heat with the battery cells, the coolant circuit also being fluidly connected to the hydraulic actuator at an actuator inlet; and
a controller configured to control a supply of coolant from the coolant circuit to the hydraulic actuator as a function of whether the battery cells are being charged or discharged,
the controller being configured to control the coolant circuit to provide coolant to the hydraulic actuator to move the piston in the stacking direction and force the battery cells together in the stacking direction in response to the battery cells being discharged.

2. The battery assembly as recited in claim 1 wherein the controller is configured to:
supply coolant into the hydraulic actuator at a first pressure in response to the battery cells being discharged; and
supply coolant into the hydraulic actuator at a second pressure in response to the battery cells being charged, the first pressure being greater than the second pressure.

3. The battery assembly as recited in claim 2 wherein the anode material of each battery cell expands during charging and contracts during discharging, the first pressure being a function of a total amount the anode materials contract in the stacking direction.

4. The battery assembly as recited in claim 3 wherein the cathode material of each battery cell contracts during charging and expands during discharging, the first pressure being a function of a total amount the anode materials contract in the stacking direction minus a total amount the cathode materials expand in the stacking direction.

5. The battery assembly as recited in claim 1 further comprising a pump and at least one flow regulator, the controller configured to control the supply of coolant to the hydraulic actuator by controlling the pump and/or the at least one flow regulator.

6. The battery assembly as recited in claim 5 further comprising a coolant tank supplying coolant to the pump, the at least one flow regulator including a first flow regulator between the pump and the hydraulic actuator and a second flow regulator between the pump and the housing inlet.

7. The battery assembly as recited in claim 1 wherein the hydraulic actuator includes an actuator housing fixed with respect to the battery housing, the piston being movable within the actuator housing, the piston being movable in the stacking direction toward the battery cells to maintain a predetermined amount of force on the battery cells in the stacking direction to produce a predetermined contact pressure between the battery cells in both a discharging orientation and a charging orientation of the battery cells.

8. The battery assembly as recited in claim 7 wherein the hydraulic actuator includes a pressure plate for contacting an end battery cell of the battery cells to force the battery cells together in the stacking direction.

9. The battery assembly as recited in claim 1 wherein the battery cells are electrically connected in parallel.

10. The battery assembly as recited in claim 1 wherein the anode material is a lithium metal configured to expand during charging of the battery cells and configured to contract during discharging of the battery cells.

11. A method of constructing a battery assembly comprising:

stacking a plurality of battery cells within a battery housing in a stacking direction, each of the battery cells comprising:

an anode current collector;

an anode material on the anode current collector;

a cathode current collector;

a cathode material on the cathode current collector; and a solid-state electrolyte sandwiched between the anode material and the cathode material for transporting ions between the anode material and the cathode material;

fluidly connecting a coolant circuit to a housing inlet of the battery housing for providing coolant to the battery cells via the housing inlet and fluidly connecting the coolant circuit to an actuator inlet of a hydraulic actuator for forcing the battery cells together in the stacking direction when the battery cells are being discharged, the hydraulic actuator including a piston that is movable in the stacking direction for forcing the battery cells together in the stacking direction;

determining the battery cells are being discharged; and in response to determining the battery cells are being discharged, controlling the coolant circuit to provide coolant to the hydraulic actuator to move the piston in the stacking direction and force the battery cells together in the stacking direction.

12. The battery assembly as recited in claim 1 wherein the coolant circuit includes a first section extending from a coolant tank to an intersection, a second section extending from the intersection to the housing inlet and a third section extending from the intersection to the hydraulic actuator;

the battery assembly further comprising:

a coolant pump in the first section;

a first flow regulator in the second section; and a second flow regulator in the third section.

13. The battery assembly as recited in claim 12 wherein the battery housing includes a housing outlet, the coolant circuit including a fourth section extending from the housing outlet to the coolant tank to provide coolant exiting the battery housing to the coolant tank.

14. The battery assembly as recited in claim 13 wherein the housing inlet is arranged on the battery housing to provide coolant into the battery housing in a flow direction transverse to the stacking direction.

15. The battery assembly as recited in claim 12 wherein the housing includes a first wall and a second wall each extending parallel to the stacking direction and a third wall and a fourth wall each extending transverse to the stacking direction, the battery cells each have two opposing planar surfaces facing the stacking direction, the two opposing planar surfaces being a first planar surface facing the third wall and a second planar surface facing the fourth wall, the battery cells each have an anode current collector, an anode material, a cathode current collector, a cathode material and a solid-state electrolyte being stacked sequentially in the stacking direction between the first planar surface and the second planar surface of the respective battery cell, the hydraulic actuator configured for forcing the battery cells toward the third wall.

16. The battery assembly as recited in claim 15 wherein the hydraulic actuator is positioned within the fourth wall.

17. The battery assembly as recited in claim 15 wherein the battery cells include a first end battery cell, a second end battery cell and a plurality of intermediate cells arranged between the first end battery cell and the second end battery cell in the stacking direction, the hydraulic actuator includes a pressure plate for contacting the second planar surface of the first end battery cell.

18. The battery assembly as recited in claim 17 wherein the first planar surface of the second end battery cell contacts the third wall.

19. The battery assembly as recited in claim 15 wherein the housing inlet is in the first wall and a housing outlet is in the second wall.

* * * * *